(12) United States Patent
Hallendorff et al.

(10) Patent No.: US 10,918,015 B2
(45) Date of Patent: Feb. 16, 2021

(54) AUTOMATIC LINE FEED FOR TRIMMER

(71) Applicant: HUSQVARNA AB, Huskvarna (SE)

(72) Inventors: Johan Hallendorff, Jönköping (SE);
Tomas Wykman, Jönköping (SE);
Stefan Kullberg, Jönköping (SE);
Rickard Skogward, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/763,964

(22) PCT Filed: Oct. 6, 2016

(86) PCT No.: PCT/EP2016/073903
§ 371 (c)(1),
(2) Date: Mar. 28, 2018

(87) PCT Pub. No.: WO2017/060366
PCT Pub. Date: Apr. 13, 2017

(65) Prior Publication Data
US 2018/0271010 A1  Sep. 27, 2018

(30) Foreign Application Priority Data

Oct. 8, 2015 (WO) ................. PCT/EP2015/073278

(51) Int. Cl.
*A01D 34/416* (2006.01)
(52) U.S. Cl.
CPC ..... *A01D 34/4162* (2013.01); *A01D 34/4161* (2013.01); *A01D 34/4163* (2013.01)
(58) Field of Classification Search
CPC ............ A01D 34/4161; A01D 34/4162; A04D 34/4163
See application file for complete search history.

(56) References Cited

U.S. PATENT DOCUMENTS 4,107,901 A  8/1978  Moore
4,118,864 A  10/1978  Pittinger, Sr. et al.
(Continued)

FOREIGN PATENT DOCUMENTS

CN  1086376 A  5/1994
CN  1210664 A  3/1999
(Continued)

OTHER PUBLICATIONS

International Search Report and Written Opinion for International Application No. PCT/EP2015/073278 dated Jun. 6, 2016, all enclosed pages cited.

(Continued)

*Primary Examiner* — Jennifer B Swinney
(74) *Attorney, Agent, or Firm* — Burr & Forman, LLP

(57) ABSTRACT

A trimmer head arranged to be driven to rotate a trimmer line, where the trimmer head includes a housing and an inner body connected to a trimmer line spool. The inner body is arranged to be movable relative the housing so that a trimmer line spooled around the trimmer line spool is released and pulled out by a centrifugal force caused by the rotation of the trimmer head, thereby allowing feed of the trimmer line. The trimmer further includes drive means for driving the trimmer head to rotate, and the trimmer is arranged to cause a relative movement of the inner body relative the housing by changing the rotation speed of the trimmer head.

15 Claims, 10 Drawing Sheets

(56) References Cited

U.S. PATENT DOCUMENTS

| | | |
|---|---|---|
| 4,134,204 A | 1/1979 | Perdue |
| 4,136,446 A | 1/1979 | Tripp |
| 4,138,810 A | 2/1979 | Pittinger, Sr. et al. |
| 4,195,408 A | 4/1980 | Palmieri et al. |
| 4,209,902 A | 7/1980 | Moore et al. |
| 4,211,004 A | 7/1980 | Woods |
| 4,211,005 A | 7/1980 | Woods |
| 4,285,128 A | 8/1981 | Schnell et al. |
| 4,369,577 A | 1/1983 | Gise et al. |
| 4,426,780 A | 1/1984 | Foster |
| 4,524,515 A | 6/1985 | Oberg |
| 4,566,189 A * | 1/1986 | Muto ................ A01D 34/4162 30/276 |
| 4,578,863 A | 4/1986 | Laverick |
| 4,651,421 A * | 3/1987 | Zerrer ............... A01D 34/4162 30/347 |
| 4,866,846 A * | 9/1989 | Hoffmann .......... A01D 34/4162 30/276 |
| 4,989,321 A * | 2/1991 | Hoffmann .......... A01D 34/4162 30/276 |
| 5,063,673 A * | 11/1991 | Webster ............. A01D 34/4162 30/276 |
| 5,109,607 A | 5/1992 | Everts |
| 5,657,542 A | 8/1997 | White, III et al. |
| 6,862,811 B2 | 3/2005 | Mitchell |
| 7,017,272 B2 | 3/2006 | Grace |
| 2006/0123635 A1 * | 6/2006 | Hurley ............... A01D 34/4163 30/276 |
| 2008/0092398 A1 * | 4/2008 | Hurley ................ A01D 34/905 30/276 |
| 2012/0066913 A1 * | 3/2012 | Alliss ................ A01D 34/4162 30/276 |
| 2012/0102755 A1 | 5/2012 | Racov et al. |

FOREIGN PATENT DOCUMENTS

| | | | |
|---|---|---|---|
| DE | 2828425 A1 * | 1/1980 | ......... A01D 34/4162 |
| DE | 2855990 A1 * | 7/1980 | ......... A01D 34/4162 |
| DE | 4227487 A1 | 2/1994 | |
| EP | 417966 A1 | 3/1991 | |
| EP | 0512784 A1 | 11/1992 | |
| EP | 1670305 A2 | 6/2006 | |
| EP | 2451264 A1 | 5/2012 | |
| EP | 3143860 A1 | 3/2017 | |

OTHER PUBLICATIONS

International Search Report and Written Opinion for International Application No. PCT/EP2016/073903 dated Dec. 19, 2016, all enclosed pages cited.

International Preliminary Report on Patentability for International Application No. PCT/EP2015/073278 dated Apr. 10, 2018, all enclosed pages cited.

International Preliminary Report on Patentability for International Application No. PCT/EP2016/073903 dated Apr. 10, 2018, all enclosed pages cited.

* cited by examiner

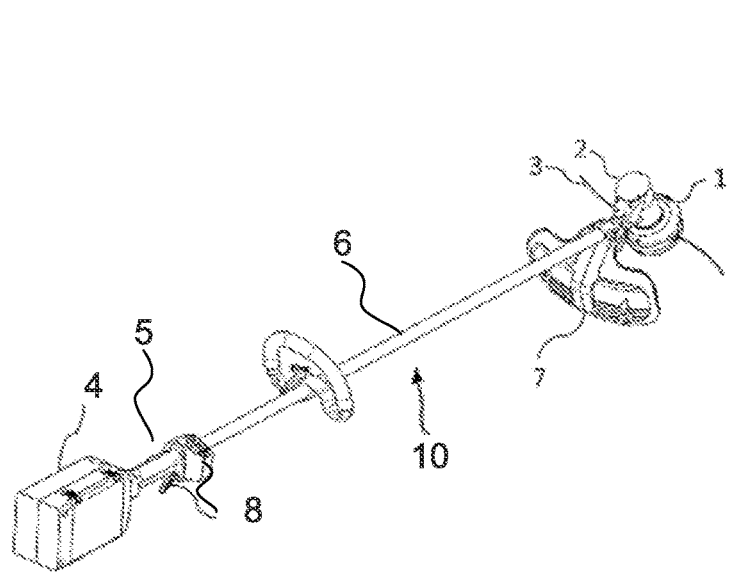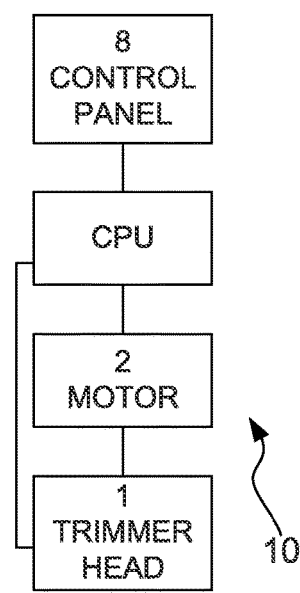
Fig. 1A
Fig. 1B
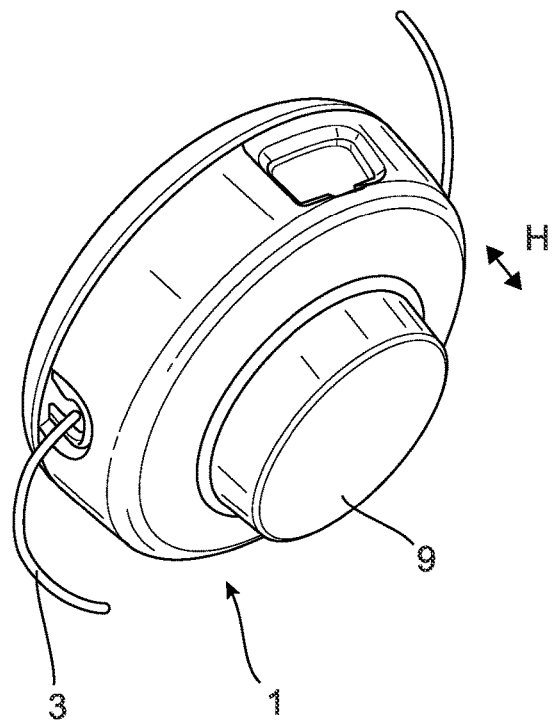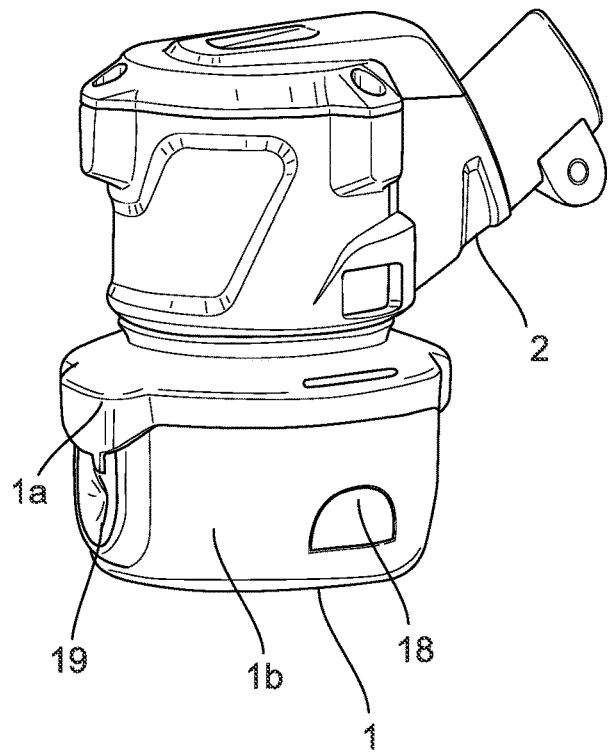
Fig. 2
PRIOR ART
Fig. 3

AUTOMATIC LINE FEED FOR TRIMMER

TECHNICAL FIELD

This application relates to a method, a trimmer head and a trimmer for feeding a trimmer line for a trimmer and in particular to automated feeding a trimmer line for an electric trimmer.

BACKGROUND

An electric trimmer operates by spinning or rotating a line or several lines at high speed. As the line hits the grass, or other growth, the grass is cut by the line. This physical interaction between the grass and the trimmer line causes the trimmer line to be worn and the line is typically shortened over time. To provide for an even cutting operation, more line needs to be fed.

A prior art solution is to provide the trimmer with a push button arranged on the underside of the trimmer head. As an operator wants to feed more line, he can do so by gently pushing the trimmer head to the ground, thereby pushing the push button which causes the line to be fed.

Such a solution is shown in for example U.S. Pat. Nos. 5,657,542 and 4,524,515. However, as the push button protrudes from the trimmer head, this arrangement adds to the cutting height of the trimmer head and is thus unsuitable for close and precise trimming. Such solutions have been around for many years and thus pose a longstanding problem.

Furthermore, the "bumping" action causes unwanted circular marks to be formed in the grass.

There is thus a need for an improved manner of feeding the trimmer line while allowing for a low cutting height.

SUMMARY

It is an object of the teachings of this application to overcome the problems listed above by providing a trimmer head arranged to be driven to rotate a trimmer line, wherein the trimmer head comprises a housing and an inner body connected to a trimmer line spool, the trimmer head being characterized in that the inner body is arranged to be movable relative the housing so that a trimmer line spooled around the trimmer line spool is released and to be pulled out by a centrifugal force caused by the rotation of the trimmer head, thereby allowing feed of the trimmer line.

It is also an object of the teachings of this application to overcome the problems listed above by providing a trimmer comprising a trimmer head according to above, wherein the trimmer further comprises drive means for driving the trimmer head to rotate and wherein the trimmer is arranged to cause a relative movement of the inner body relative the housing by changing the rotation speed of the trimmer head.

It is also an object of the teachings of this application to overcome the problems listed above by providing a method for controlling a trimmer comprising a trimmer head comprising a housing and an inner body connected to a trimmer line spool, the trimmer head, the method comprising moving the inner body relative the housing so that a trimmer line spooled around the trimmer line spool is released and to be pulled out by a centrifugal force caused by the rotation of the trimmer head, thereby allowing for feed of the trimmer line.

This allows for a reduced cutting height and also reduces the risk of circular marks forming when the push button is bumped so to say against the ground.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which:

FIG. 1A shows an example of a trimmer;

FIG. 1B shows a schematic view of a trimmer;

FIG. 2 shows an example of a prior art trimmer head having a push button for releasing or feeding trimmer line;

FIG. 3 shows an illustration of a trimmer head according to the present invention and an attached electric motor according to an example embodiment;

DETAILED DESCRIPTION

Figure 4A:
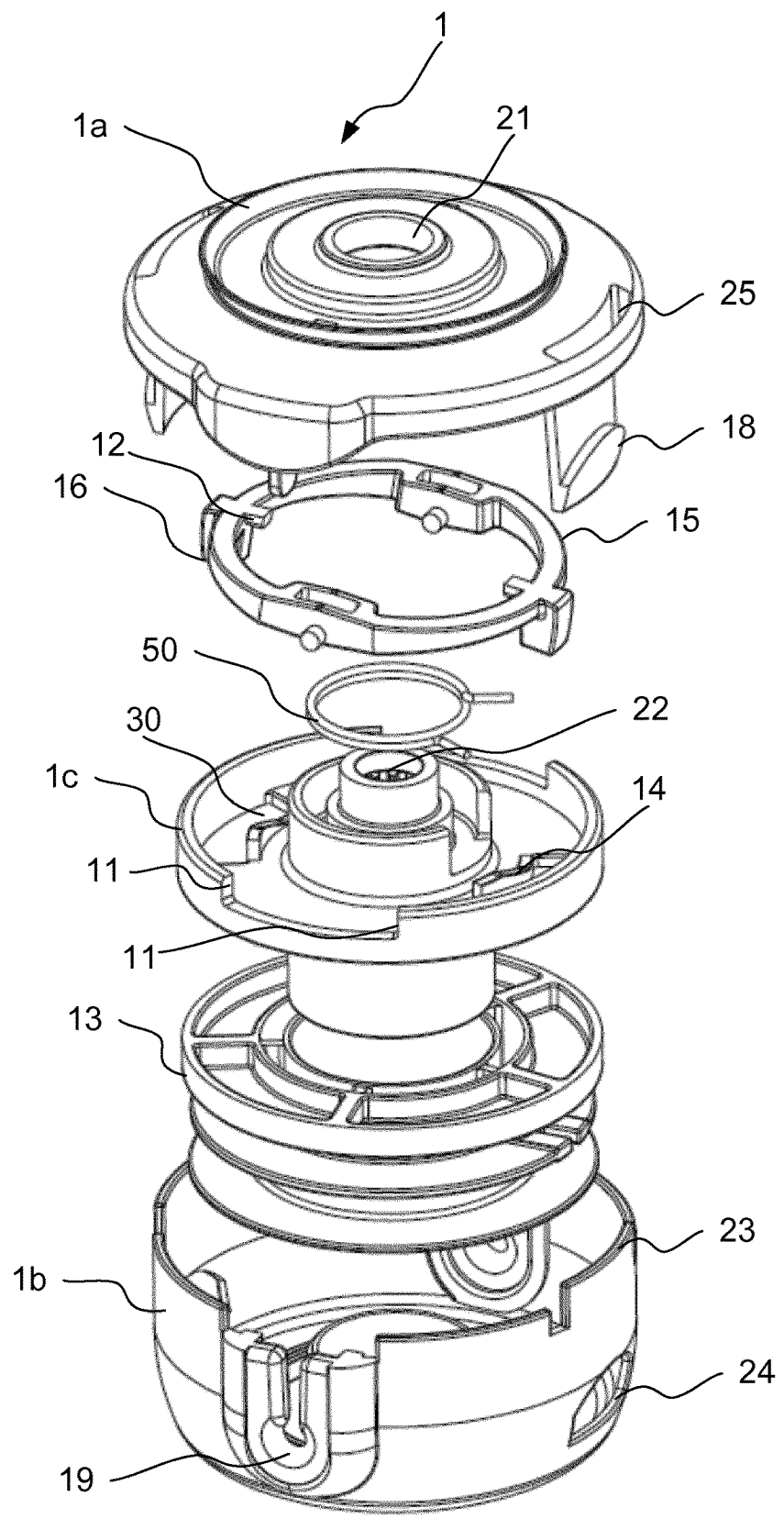
FIG. 4A shows an exploded view of a trimmer head according to an example embodiment.

The disclosed embodiments will now be described more fully hereinafter with reference to the accompanying drawings, in which certain embodiments of the invention are shown. This invention may be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

All indications of rotational speeds and time durations are given as examples and may be varied in many different ways as would be apparent to a skilled person. The variations may be for individual entities as well as for groups of entities and may be absolute or relative.

FIG. 1A illustrates a perspective view of an electric trimmer 10 of an example embodiment. The trimmer comprises a power source 4, which in the example of an electric trimmer is an electrical power source, such as a battery or grid connector for providing electrical power to an electric motor 2 arranged to rotate the trimmer head 1, being a rotary cutting equipment. In the example of an engine powered trimmer the power source is a fuel tank for providing fuel to an engine 4 for driving the trimmer head 1 through a gear assembly 2. Even though the description herein will focus on an electric trimmer, it should be noted that the teachings herein may also be used with a combustion or turbine engine powered trimmer. For example, a repetitive change in speed (acceleration followed by deceleration)—as will be discussed in further detail in the below—may be accomplished by increasing the rotational speed of a motor by providing an increase/decrease in electrical power as well as by revving an engine by increasing/decreasing the fuel injection.

The trimmer head comprises a trimmer line 3 which extends radially from the trimmer head 1. The trimmer line 3 may extend in any number of directions, but a balanced arrangement is preferred. Typically two trimmer lines 3 are used and arranged to extend in opposite directions from one another.

The trimmer 10 further comprises at least one handle 5 and a pole 6 on which the power supply 4 and the trimmer head 1 are arranged and a trim guard or shield 7. Arranged adjacent to (or on) the at least one handle 5 is a control panel 8 comprising one or more buttons, such as a speed control, start button and/or a button for initiating the automated trimmer line feed. For example, the control panel 8 may comprise a dead-man's-hand switch (to be depressed by the palm of a user's hand when holding the grip 5), a throttle control switch (to be actuated by the user's fingers) and a feed line button (possibly arranged as a thumb control button), among other controls such as for changing the power level, changing the rotational direction to mention a few examples. The control panel may also comprise visual indicators such as LEDs (Light Emitting Diodes) for indicating a status of the trimmer 10.

The trimmer 10 may be a two-way trimmer as is disclosed in the US Patent Application published as US2012102755A1, the disclosure of which is hereby incorporated by reference. The trimmer 10 may also be a one-way trimmer.

FIG. 1B shows a schematic view of a trimmer 10 wherein a controller CPU is connected to the motor 2 for controlling the operation of the motor 2. The motor 2 in turn being connected to the trimmer head 1 for driving the trimmer head 1. It should be noted that the motor 2, may be replaced by a combustion engine in some embodiments.

The controller CPU is arranged to receive inputs such as through the command panel 8 for affecting the operation of the motor 2 and thereby the operation of the trimmer 10. The controller CPU may also be connected to the motor 2 and/or to the trimmer head 1 for receiving input, such as the load on the drive shaft and/or the current rotational speed, based on which the controller CPU may change or control the operation of the trimmer.

In one embodiment the controller may be configured to receive input regarding the current load on the drive shaft and based on this determine that the trimmer line is too short and is to be fed. As the inventors have realized, such a determination may be based on that when the trimmer line is operating by for example cutting grass, the load on the drive shaft will vary as the trimmer line sometimes does not cut through homogeneous material sometimes hitting air pockets. The resulting power graph will thus have ripples making it difficult to ascertain any specific power level. The trimmer may then be configured to determine that the power consumption is substantially stable and in response thereto determine if the power consumption is below a threshold level in which case trimmer line is to be fed. The threshold level depends on many attributes, such as size of the trimmer and size of trimmer line. The trimmer controller may in one embodiment be configured to compare a current load (e.g. power consumption) at a current rotation speed with a predetermined power consumption at said current rotation speed. If the current load is less than the predetermined power consumption, trimmer line is to be fed. This may preferably be performed when no or only a small amount of ripples are present in the load, such as during idle speed or when the trimmer is rotating at other speeds but not cutting through grass or other material.

Alternatively, the trimmer head may comprise a sensor (not shown explicitly) for detecting that the trimmer line is too short and should be fed. Examples of such sensors are mechanical switches being affected by the trimmer line, optical sensors detecting the presence of the trimmer line to mention a few examples. As the sensor would most likely detect an absence of trimmer line, the controller would then be configured to feed trimmer line if it is determined that the sensor detects a lack of trimmer line.

FIG. 2 shows an example of a prior art trimmer head 1 having a push button 9 for releasing or feeding trimmer line 3. The height of the grass to be cut is limited by the height of the push button 9 as is indicated by the double-headed arrow H.

FIG. 3 shows an illustration of a trimmer head 1 according to the present invention and an attached electric motor 2. The trimmer head 1 has an upper housing 1a and a lower housing 1b for carrying the trimmer line. As would be understood by a skilled person the dimensions of the upper housing 1a and the lower housing 1b may be varied to numerous variations while still allowing the trimmer line to be housed therein.

Figure 4B:
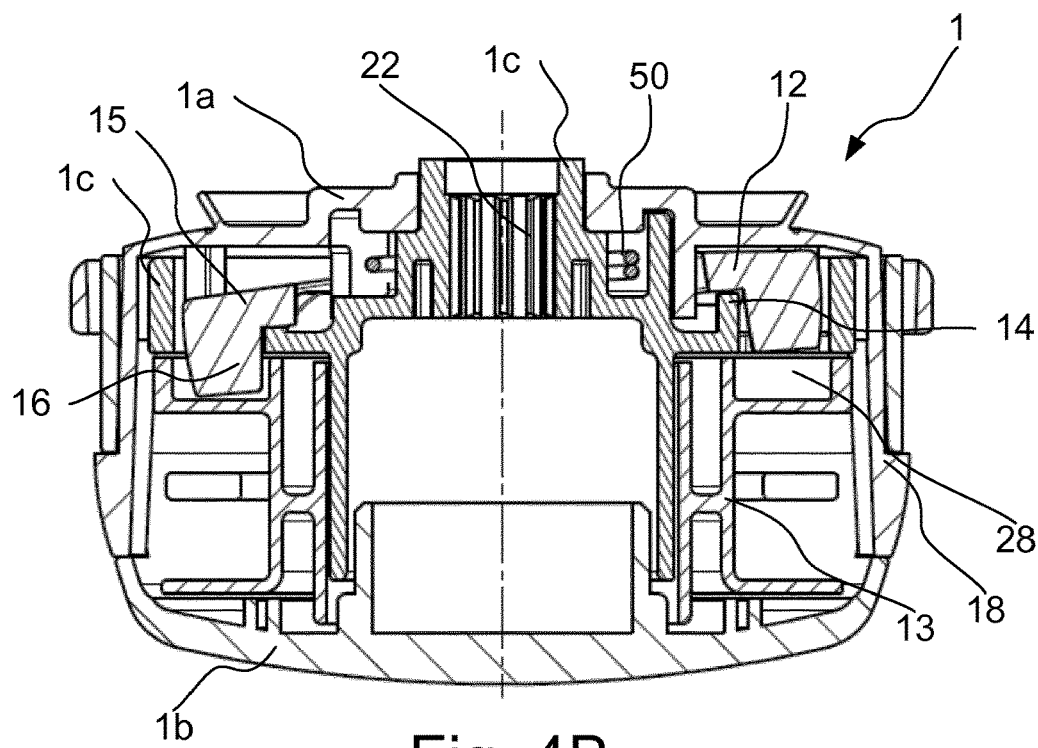
FIG. 4B shows a cut away side view of a trimmer head according to an example embodiment.
Figure 5:
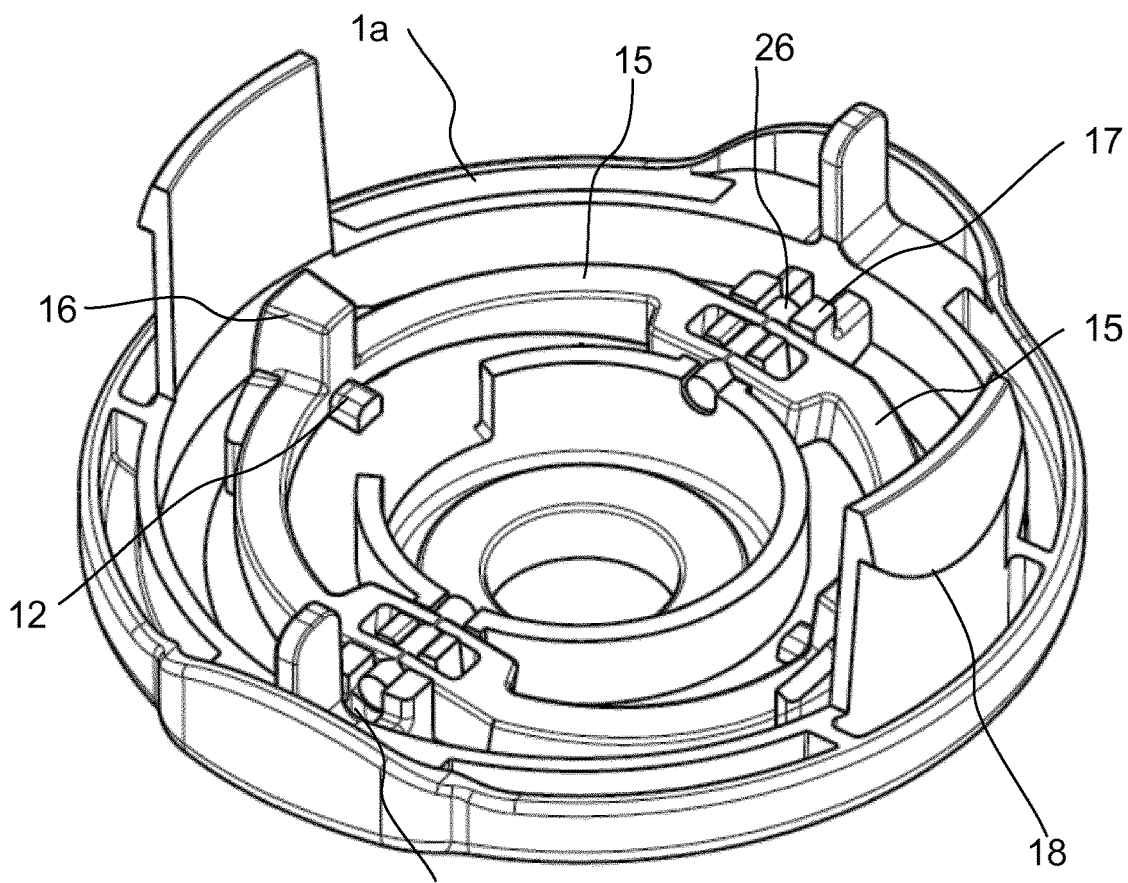
FIG. 5 shows an up-side-down view of an upper body of a trimmer head according to an example embodiment.

The trimmer head will now be disclosed in detail with simultaneous reference to FIGS. 3, 4A, 4B and 5. FIG. 4A shows an exploded view of the trimmer head 1. FIG. 4B shows a cut away side view of the trimmer head 1. FIG. 5 shows an up-side-down illustration of a subassembly comprising the upper housing 1a and a rocker lever 15.

The lower housing 1b is arranged to be connected to the upper housing 1a when in use for example through clasps 18 and possibly flanges 23 arranged to extend through and possibly engage holes or openings 24 arranged on the lower housing 1b and holes or openings 25 arranged on the upper housing 1a respectively.

The trimmer head 1 also comprises an inner body 1c in the form of a disc arranged with at least one cleat 11. In FIG. 4A, two cleats 11 are shown. The cleats 11 of the inner body 1c are arranged to interact with stops 17 arranged on the upper housing 1*a*. The inner body 1*c* is connected to the upper housing 1*a* by a spring 50, which for example is a torsion spring.

The inner body 1*c* is arranged to be rotatably arranged with respect to the upper and lower housing 1*a*, 1*b* to a degree defined by the cleats 11 interacting with the stops 17 on the upper housing 1*a*. It should be noted that the stops 17 may also or alternatively be arranged on the lower housing 1*b* depending on the design of the upper and lower housing. Having the stops 17 arranged on the upper housing simplifies replacing the trimmer line 3. The inner body 1*c* is furthermore rotatably connected to a trimmer line spool 13 on which a trimmer line may be spooled. The trimmer line 3 will extend through holes or openings 19 in the lower housing 1*b* when in use.

The inner body is thus arranged to be rotatable with a drive shaft (to be entered through a drive shaft opening 21 of the upper housing 1*a* to engage the inner body 1*c* possibly by interacting with notches 22 or by the inner body 1*c* being attached to the drive shaft in another way) in relation to the upper and lower housing 1*a*, 1*b* to a degree determined by the interaction of the stops 17 and the cleats 11. This will cause the inner body 1*c* arrangement (including the spool and any trimmer line) to move relative the upper and lower housing arrangement 1*a*, 1*b* when the rotating speed changes—at least if the accelerative or decelerative forces overcome any frictional forces attenuated by the centrifugal forces during operation. As the spool 13 moves, the trimmer line 3 is pulled out from the housing 1*a*, 1*b* by the centrifugal forces and a length of trimmer line 3 has been fed corresponding to the relative movement.

The inventors have realized after insightful reasoning that by arranging the spool 13 to be able to rotate independently of the housing 1*a*, 1*b* and the inner body 1*c* a relative motion may be achieved by changing the rotational speed. The spool 13 may thus be made to move relative the housing 1*a*, 1*b* without manual user interaction (apart from initiating the feed possibly by pressing a button) resulting in an automated feed of the trimmer line 3.

By arranging the cleats and the stops, the amount of movement may be controlled as the cleats and stops will limit the movement of the inner body 1*c* relative the upper (or lower) housing 1*a*. The relative movement may also (additionally and/or alternatively) be controlled in other manners as will be disclosed below.

By realizing that the centrifugal force may be made to feed the trimmer line when the trimmer line is given a slack (being unwound) by a relative movement resulting from the independent movement of the inner body in relation to the housing, an automatic feeding of the trimmer line may be achieved. The relative movement may be generated in different ways, as will now be discussed, resulting in different lengths of trimmer line being fed.

Figure 6:
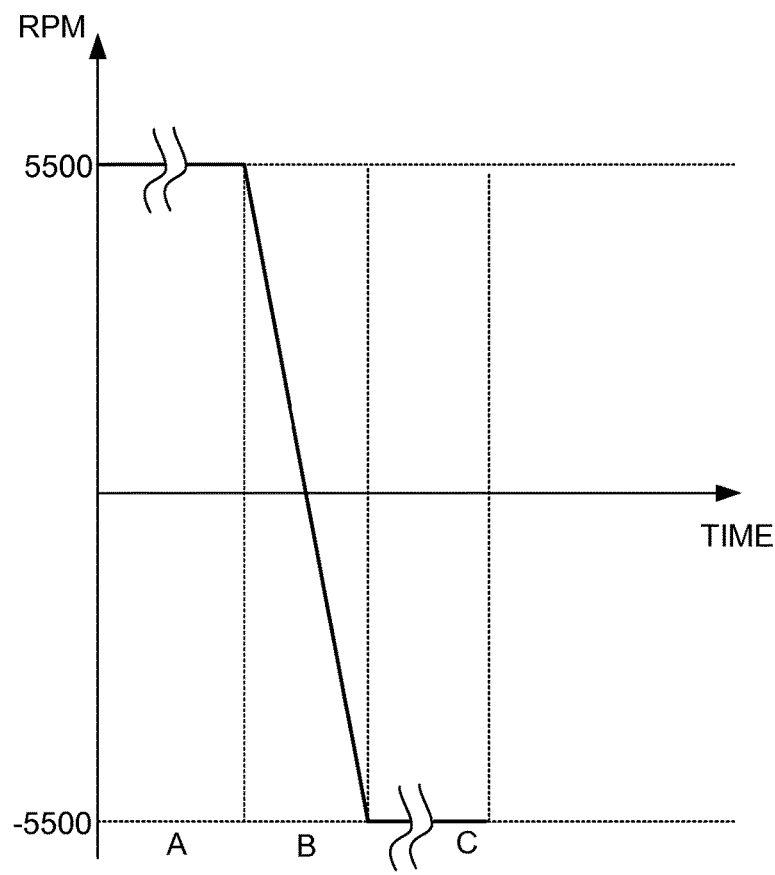
FIG. 6 shows a time graph of the revolution speed of the motor when controlling the relative movement according to an example embodiment.
Figure 7:
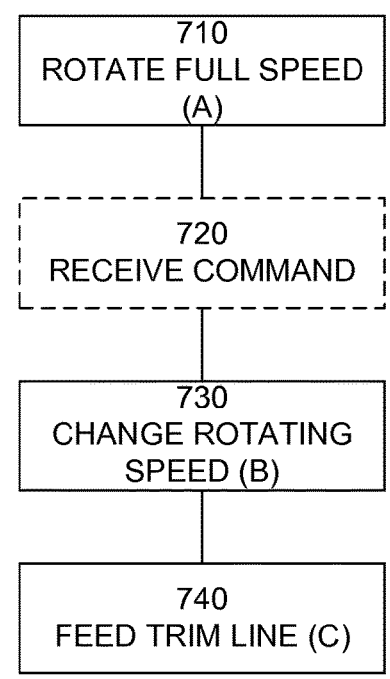
FIG. 7 shows a corresponding flowchart for a method performing the control of FIG. 6 according to an example embodiment.

FIG. 6 shows a time graph of the revolution speed of the motor 2 when controlling the relative movement and FIG. 7 shows a corresponding flowchart for a method performing the control of FIG. 6. At first the motor 2 or rather the corresponding drive shaft is rotating at full speed 710, which in one embodiment is 5500 rpm. As an operator issues a command 720 to feed the trimmer line, which may be given through a button, switch or lever on the control panel 8 and is received by the trimmer 10, the motor is caused to slow down and start to rotate in the other direction at full speed 730. The feed of the trimmer line happens as the inner body 1*c* moves relative the upper and lower housing. For a slow or soft change of direction, this happens when the direction is changed. For a more abrupt or hard deceleration, the feed may happen before the change of direction. The change in rotation speed could be made at a rate high enough so that it causes a relative movement between the inner body 1*c* and the housing 1*a*, 1*b*. Such a rate is dependent on the relationship of the inner body's mass and the housings mass as well as frictional constants. One example is to decelerate from full speed to zero speed and down to full speed in an opposite direction in less than 500 ms. As the rotation speed or the rotational direction is changed the inner body 1*c* will move in relation to the housing whereupon the trimmer line is fed automatically and remotely 740.

In one embodiment, relevant also for other embodiments herein, the rate of the change of speed is higher than what is used during normal operation. I.e. the speed changes faster during feeding of the trimmer line 3 compared to when the trimmer 10 is started or stopped. For example, the acceleration or deceleration may be four times higher during feeding of trimmer line 3 than during start up or stopping of the trimmer 10. If trimmer line 3 is to be fed, the acceleration/deceleration takes approximately 100 ms, compared to normal acceleration/deceleration, which takes approximately 400 ms.

Figure 8:
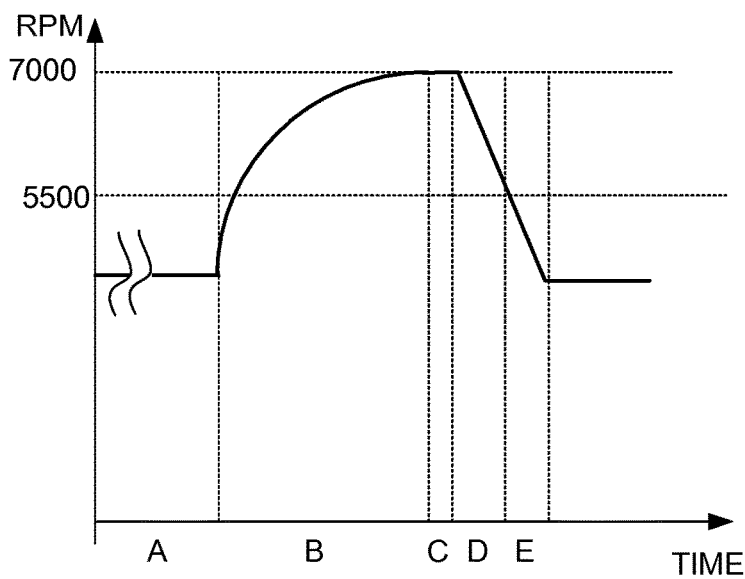
FIG. 8 shows a time graph of the revolution speed of the motor when controlling the relative movement according to an example embodiment.
Figure 9:
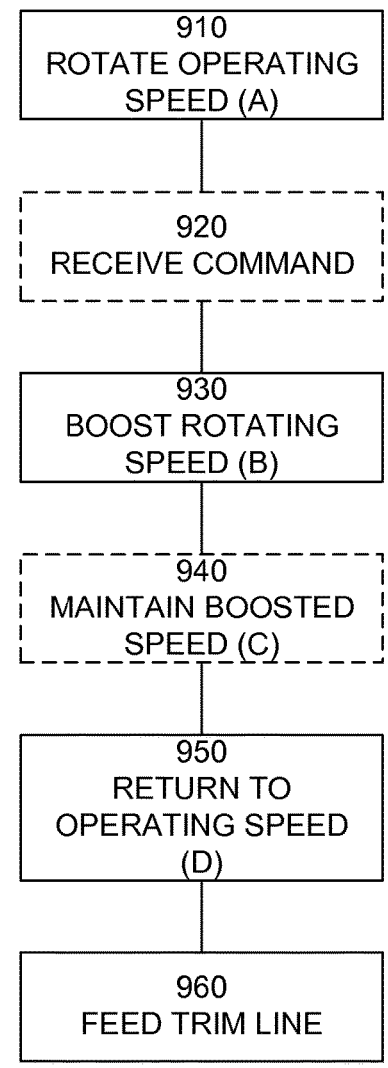
FIG. 9 shows a corresponding flowchart for a method performing the control of FIG. 8 according to an example embodiment.

Another alternative for controlling the rotation speed is shown in FIG. 8 and FIG. 9, FIG. 9 showing a flowchart for a method of implementing the control of FIG. 8. In this alternative, the motor 2 or rather the corresponding drive shaft is rotating at speed 910, which in one embodiment is 5000 rpm, being lower than the maximum speed for allowing for short burst of boosted speeds without damaging the trimmer 10. As an operator issues a command 920 to feed the trimmer line, which may be given through a button, switch or lever on the control panel 8 and is received by the trimmer 10, the motor is caused to abruptly increase the rotation speed 930 by a 50% and (optionally) maintain 940 it for about 100 ms so that the inner body 1*c* and other mechanics may reach a steady state, before decelerate 950 back to the operating speed of for example 5000 rpm. The change in rotation speed should be made at a rate high enough so that it causes a relative movement between the inner body 1*c* and the housing 1*a*, 1*b*. Such a rate is dependent on the relationship of the inner body's mass and the housings mass as well as frictional constants. One example is to accelerate from operating speed to boosted speed in less than 300 ms. As the rotation speed is changed the inner body 1*c* will move in relation to the housing whereupon the trimmer line is fed automatically and remotely 960.

Figure 10:
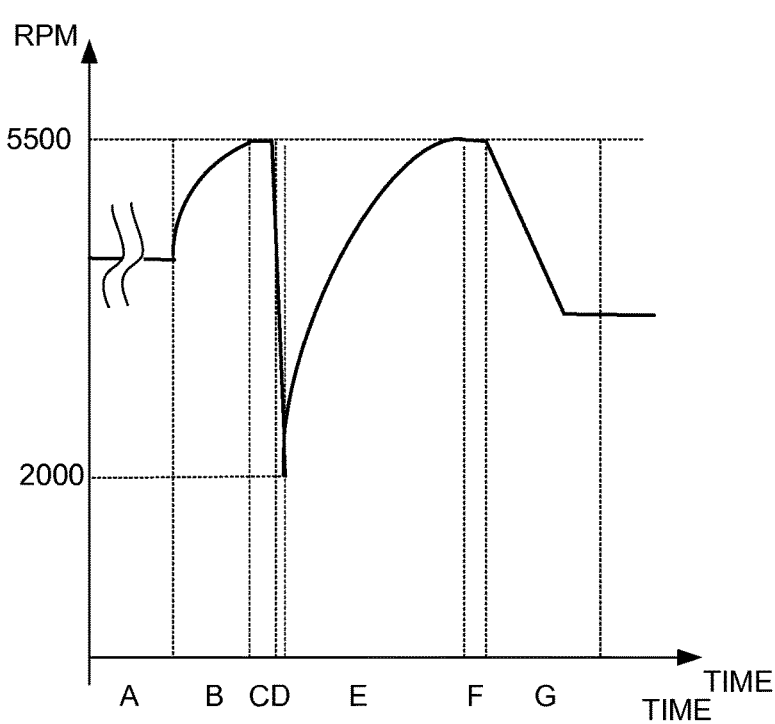
FIG. 10 shows a time graph of the revolution speed of the motor when controlling the relative movement according to an example embodiment.
Figure 11:
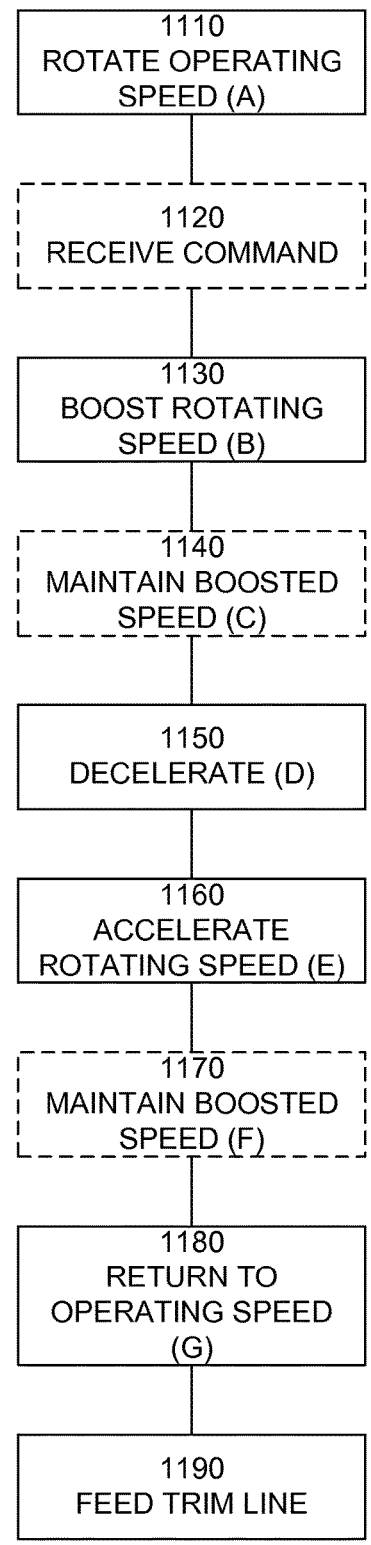
FIG. 11 shows a corresponding flowchart for a method performing the control of FIG. 10 according to an example embodiment.

Another alternative for controlling the rotation speed is shown in FIG. 10 and FIG. 11, FIG. 11 showing a flowchart for a method of implementing the control of FIG. 10. In this alternative, the motor 2 or rather the corresponding drive shaft is rotating at operating speed 1110, which in one embodiment is 4500 rpm, which is lower than the maximum speed to allow for increased speed without risking damaging the trimmer 10. As an operator issues a command 1120 to feed the trimmer line, which may be given through a button, switch or lever on the control panel 8 and is received by the trimmer 10, the motor is caused to increase the rotation speed 1130 up to maximum speed (in this example 5500 rpm) and (optionally) maintain 1140 it, e.g. for about 100 ms, so that the inner body 1*c* and other mechanics may reach a steady state, before abruptly decelerate 1150 to a trigger speed of for example 2000 rpm in about 100 ms and then accelerate 1160 up to maximum speed again, (optionally) maintain 1170 it, e.g. for about 100 ms, and then decelerate 1180 back to the operating speed of for example 5000 rpm. The change in rotation speed should be made at a rate high enough so that it causes a relative movement between the inner body 1c and the housing 1a, 1b. The preferred deceleration mentioned above is approximately 4 times faster than a normal braking event. No line is thus fed during a normal braking event. Such a rate is dependent on the relationship of the inner body's mass and the housings mass as well as frictional constants. One example is to accelerate from operating speed to boosted speed in less than 300 ms and the abrupt deceleration in under 50 ms. As the rotation speed is changed the inner body 1c will move in relation to the housing whereupon the trimmer line is fed automatically and remotely 1190.

In each of the alternatives disclosed above, and also for undisclosed alternatives, the operator may issue the command to feed the trimmer line by performing the throttling by manipulating the throttle or speed control of the trimmer 10.

In one embodiment the trimmer 10 is configured to always use one and the same rotational direction when feeding the trimmer line. In such an embodiment the trimmer may determine which direction it is currently rotating in. If it is rotating in a preferred direction it performs as above. If it rotates in an unpreferred direction, the trimmer may slow down and change rotational direction when it is to feed the line. Once the rotational direction has changed, it may perform an acceleration feeding the trimmer line after which it again reverses the rotational direction to what is was before.

In all embodiments the trimmer line 3 should be wound on the spool 13 according to which control method is being used for allowing the trimmer line to be fed when the relative motion occurs.

One specific embodiment of a trimmer head 1 will now be described in detail with reference to FIGS. 4A, 4B, 5, 12 and 13.

Figure 12:
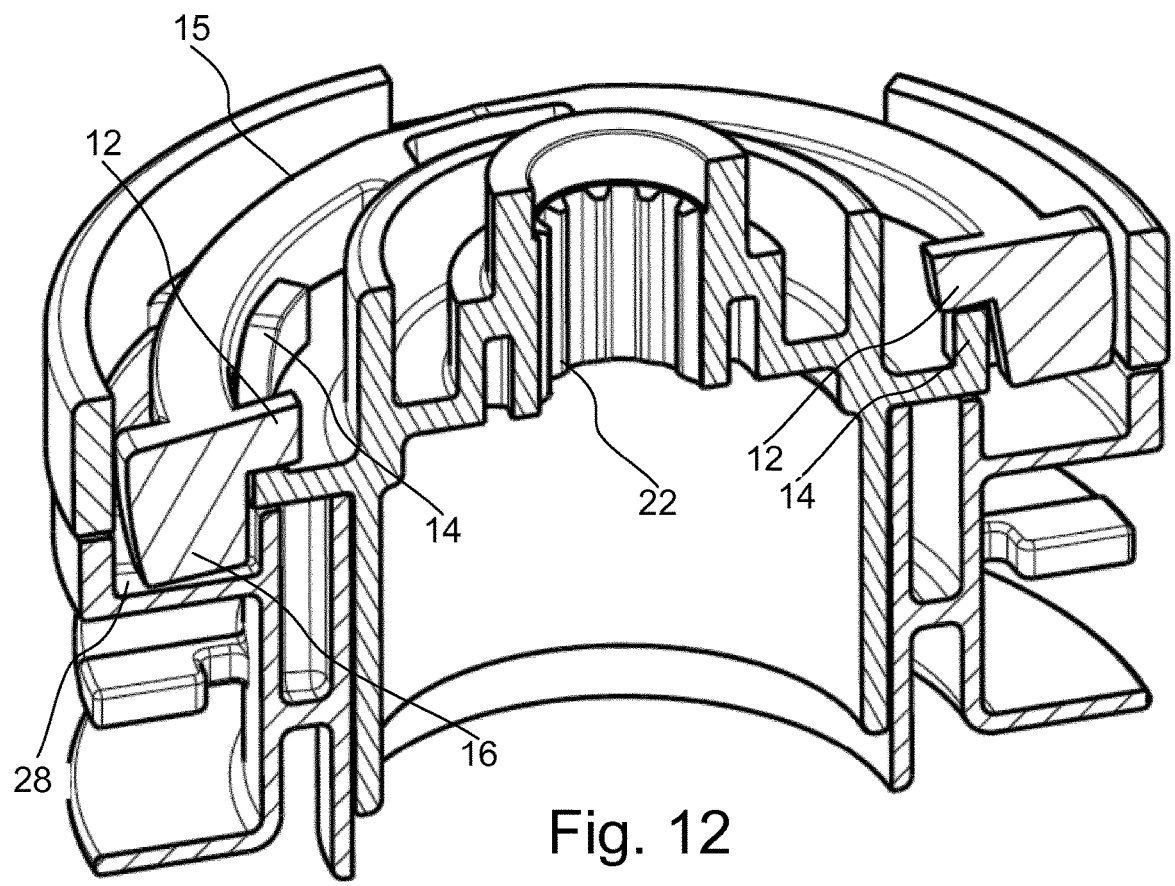
FIG. 12 is a cut away view of an inner body assembly according to an example embodiment.
Figure 13:
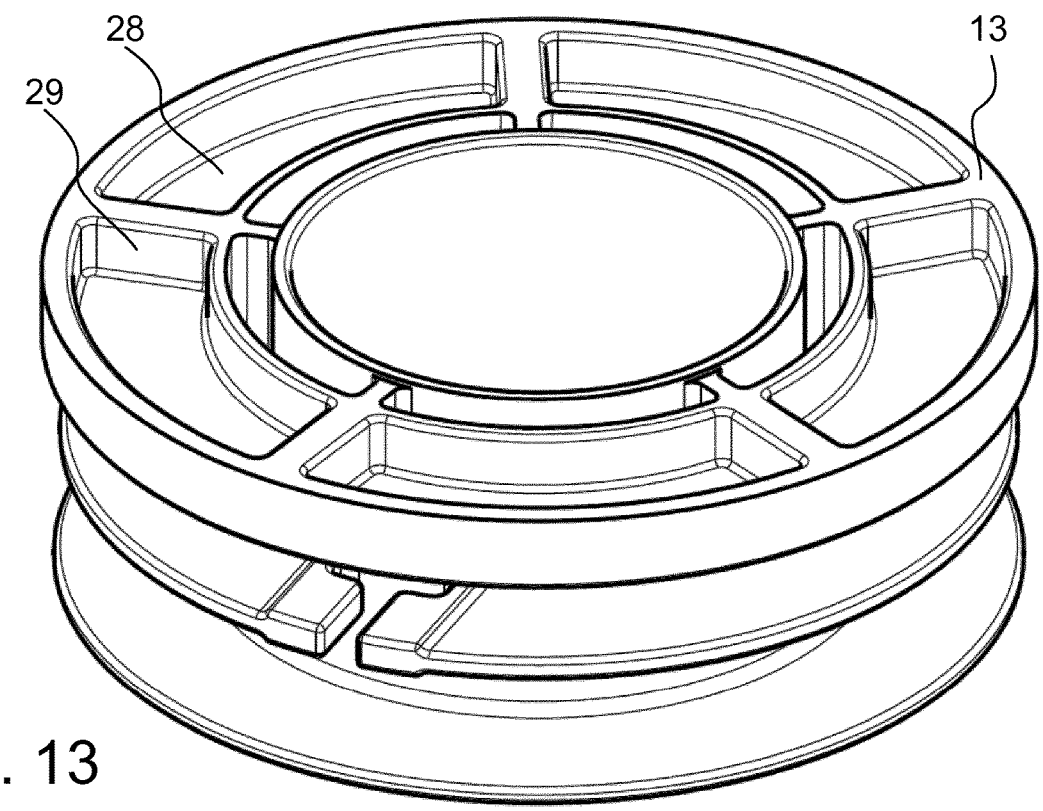
FIG. 13 shows a spool according to an example embodiment.

FIG. 12 is a cut away view of an inner body assembly according to an example embodiment. FIG. 13 shows a spool 13 according to one embodiment.

To avoid that a trimmer line 3 is being retrieved or pulled back again into the housing 1a, 1b if another relative motion happens wherein the inner body moves in the other direction compared to the housing 1a, 1b, the inner body 1c may be provided with rims or flanges 14, which are to react with at least one track follower portion 12 on the rocker lever 15. The rocker lever 15 is arranged to tilt or rock with regards to the inner body 1c and to the upper housing 1a when the inner body 1c rotates in relation to the upper and lower housing 1a, 1b. In the embodiment shown, the rocker lever 15 is pivotally attached to the upper housing 1a through two axels 26 arranged on the rocker lever 15 to engage with two slots 27 of the upper housing 1a. In the example embodiment shown the slots 27 are formed by the stops 17 of the upper housing 1a. The rocker lever 15 is also provided with one or more, preferably two, stops 16. Alternatively, the spool 13 may be arranged with the rims 14, and the stops 16 of the rocker lever 15 are then arranged to cooperate with the rims 14 through openings or holes in the inner body 1c.

The at least one track follower portion 12 of the rocker lever 15 are arranged to cooperate with the rims 14 of the inner body 1c so that as the inner body 1c (and the arrangement of the spool 13) rotates in relation to the upper housing 1a, the rims 14 of the inner body will push the rocker lever 15 as at least one of the track follower portions 12 of the rocker lever 15 moves along the rim 14 so that one of the stops 16 moves out of engagement with one stop 29 and another of the stops 16 of the inner body 1c engages with another stop 29 arranged in a groove 28 of the spool 13 through a hole or opening 30 of the inner body 1c. By providing the spool 13 with an uneven amount of stops 29 (preferably five), it is ensured that tilting motion of the rocker lever is not prevented by a stop 16 hitting the top of a stop 29 on the spool 13. I.e. a stop 16 on the rocker lever 15 will always be pushed down into a groove 28. Furthermore, the uneven amount of stops 29 on the spool 13 ensures that trimmer line is actually spooled out from spool during a tilting motion of the rocker lever 15. Thus is relative rotation of the housing and the inner body 1c translated into rocking or tilting motion of the rocker lever 15 by the interaction between the at least one track follower portion 12 on the rocker lever 15 and the rim 14 on the inner body 1c.

In one embodiment, the rocker lever 15 may be provided with only one track follower portion 12 and the inner body 1c with only one rim 14 for cooperation with the track follower portion 12. To ensure that the track follower portion 12 remains in contact with the rim 14, a biasing means such as a spring may be provided which biases the rocker lever 15 towards contact between the track follower portion 12 and the rim 14.

In one embodiment, the rocker lever comprises two opposite track follower portions 12 and the inner body 1c comprises two opposite mirrored rims 14. Thus, the motion of the rocker lever 15 is forced to follow the surfaces of the rims 14.

The rims 14 may be asymmetrical (as shown in FIG. 4A) and symmetrical. Either way, the angular extension of the rims 14 essentially corresponds to the relative angular motion allowed by the interaction between the cleats 11 on the inner body 1c and the stops 17 on the upper housing 1a. When the rims 14 are asymmetrical, line will only be fed by relative motion in one rotational direction between the inner body 1c and the housing. If the rims 14 are symmetrical, line may be fed by relative rotational motion in both directions.

An exemplary line feeding sequence will be described in the following to further aid the understanding of the concept. During normal operation, the components of the trimmer head 1 rotate as a unit. When trimmer line is to be fed, relative rotational motion of the housing (i.e. upper and lower housing 1a, 1b) and the inner body 1c is induced. This may be achieved in a number of ways as mentioned earlier. By example, the inner body 1c may be rapidly braked then accelerated again in rapid succession which causes the housing 1a, 1b to move in relation to the inner body 1c and since the rocker lever 15 is attached and rotates with the housing, it will tilt according to the cooperation between the track follower portions 12 and the rims 14. When the rocker lever 15 tilts, the spool 13 will rotate in relation to the housing and the inner body 1c due to the centrifugal forces acting on the trimmer line 3 and/or inertia of the spool 13. This is achieved since one stop 16 on the rocker lever 15 is brought out of contact with a stop 29 of the spool by the tilting motion and a opposite stop 16 is brought into a groove 28 which allows the spool 13 to rotate and unwind line until a stop 29 of the spool hits the stop 16 in the groove 28. The rocker lever 15 may furthermore be arranged to tilt both back and forth during a single feeding of line. As the relative rotational movement between the housing and the inner body 1c is limited by the cleats 11 and the stops 17, a jerk i.e. sudden stop may be generated when the cleats 11 hits the stops 17 which may further facilitate the motion of the spool 13.

This arrangement also means that the function will be the same regardless of which direction the drive shaft and the trimmer head is rotated and may operate without spooling the trimmer line on the spool 13.

As the inner body 1*c* is driven by a shaft for example engaging the notches 22, the whole arrangement of the trimmer head 1 is made to rotate as one body during normal operation, wherein the individual relative movement of the parts only serve to feed the trimmer line 3 without manual user interaction—apart from initiating the feed through for example a button press.

FIG. 13 shows the spool 13 having 5 stops 29. The distance between the stops denotes how much line is fed each time the rotation (direction or speed) changes. The more stops, the shorter line is fed. Having fewer stops may cause a more abrupt stop of the inner body and a design compromise may be made between length of trimmer line to feed and smoothness of operation.

In one embodiment the inner body 1*c* has a mass that is lower than that of the housing 1*a*, 1*b*. This enables for a faster reaction for initiating the line feed, especially when the trimmer line is already short.

In one embodiment the inner body is furthermore arranged with a spring for maintaining the inner body in a fixed position with regards to the housing regardless of the rotational direction. The spring coefficient of such a spring is then chosen dependent on the frictional coefficients and also the mass relationships between the inner body (including the spool, which, in one embodiment, is linked to the housing via the rocker lever) and the housing so that the acceleration or deceleration used for effecting the line feed is high enough to overcome the spring's force and thus move the inner body in relation to the housing as has been discussed in the above. The acceleration or deceleration needed for relative motion is also dependent on for instance the surface friction between the at least one track follower portions and the at least one rim and the incline of the rim also has an effect on this. These aspects must be considered and chosen correctly to achieve the desired functionality of the feeding line.

Furthermore, unwanted relative motion of the housing and the inner body may be prevented by applying a centrifugal clutch which prevents relative motion of the two above certain rotational speeds.

The inventors have further realised that as the line is spooled around the spool in one direction, the centrifugal forces will always cause the spool to rest on the same stops (of the inner body) regardless which the rotation direction is.

Another embodiment of a trimmer head 1, which comprises both the spring 50, as earlier described, and the centrifugal clutch, will be described in the following with reference to FIGS. 14-17.

The trimmer head 1 comprises, as in the previously described embodiment, an upper housing 1*a*, a lower housing 1*b*, an inner body 1*c* and a spool 39. The upper 1*a* and lower 1*b* housing and the inner body 1*c* have the same functionality as in the previously described example embodiment. Therefore, only the differences between the two embodiments will be described below.

In this embodiment, a locking lever 36 is mounted in the upper housing 1*a*. The locking lever 36 comprises a guiding pin 47 and a locking pin 48. Further, a spring holding member 38 is arranged in the upper housing 1*a*. In the described embodiment, the spring holding member 38 comprises a notch 37, and a strong spring 50, preferably a torsion spring, which is arranged in the spring holding member 38 such that it is compressed. In other embodiments, the notch 37 may be an opening, e.g. an elongate opening, into which the locking pin 48 fits and may be controlled by.

Additionally, the spring holding member 38 comprises a spring wire 45 arranged in connection with a pin 46. In another embodiment, the spring wire may be replaced by a coil spring, or any other type of suitable spring.

The spool 39 is provided with a recess 42, which, in this embodiment, is located on the surface facing the upper body 1*a*. In other embodiments, the recess 42 may be located next to the surface facing the upper body 1*a*.

Figure 14:
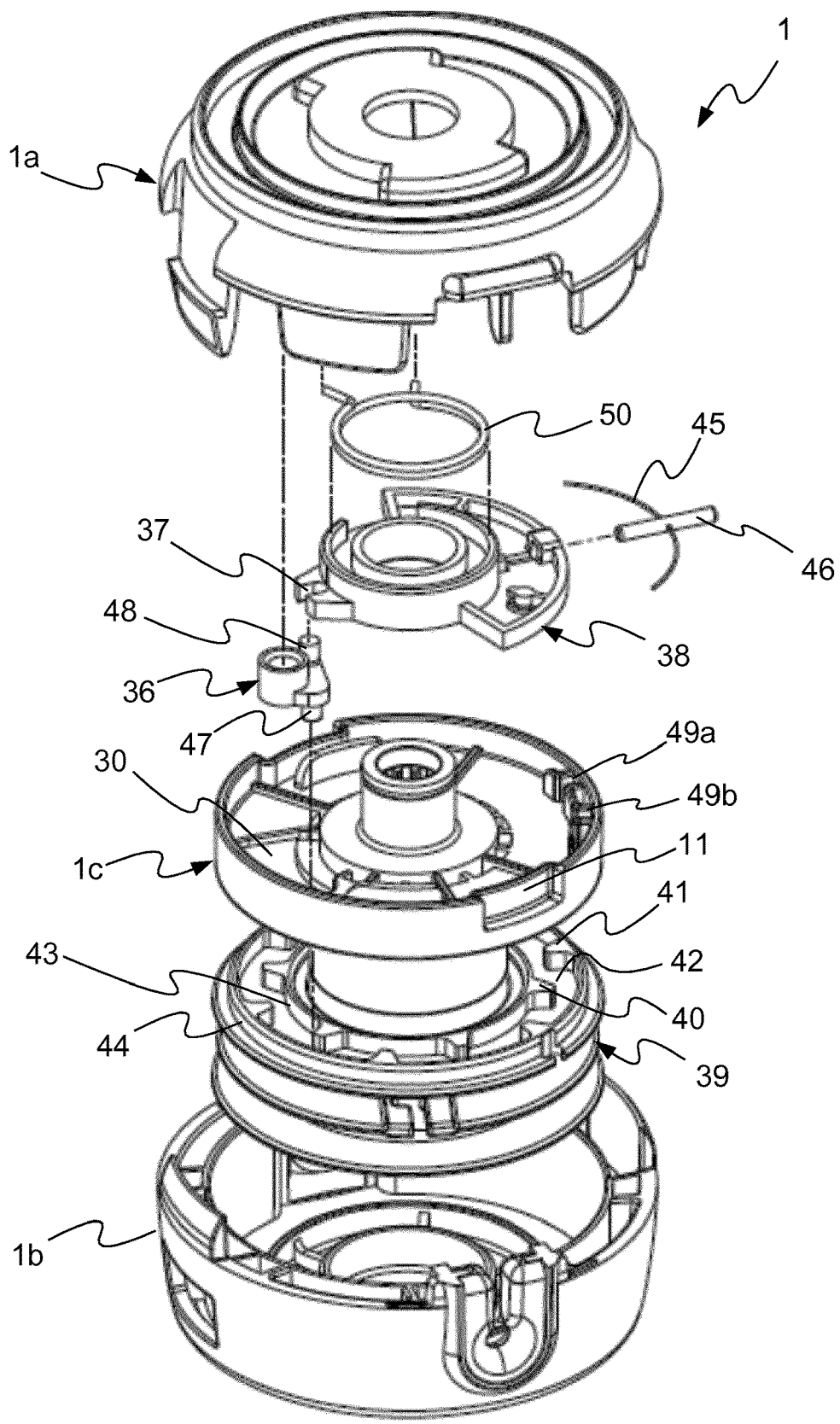
FIG. 14 shows an exploded view of a trimmer head according to a second example embodiment.
Figure 15:
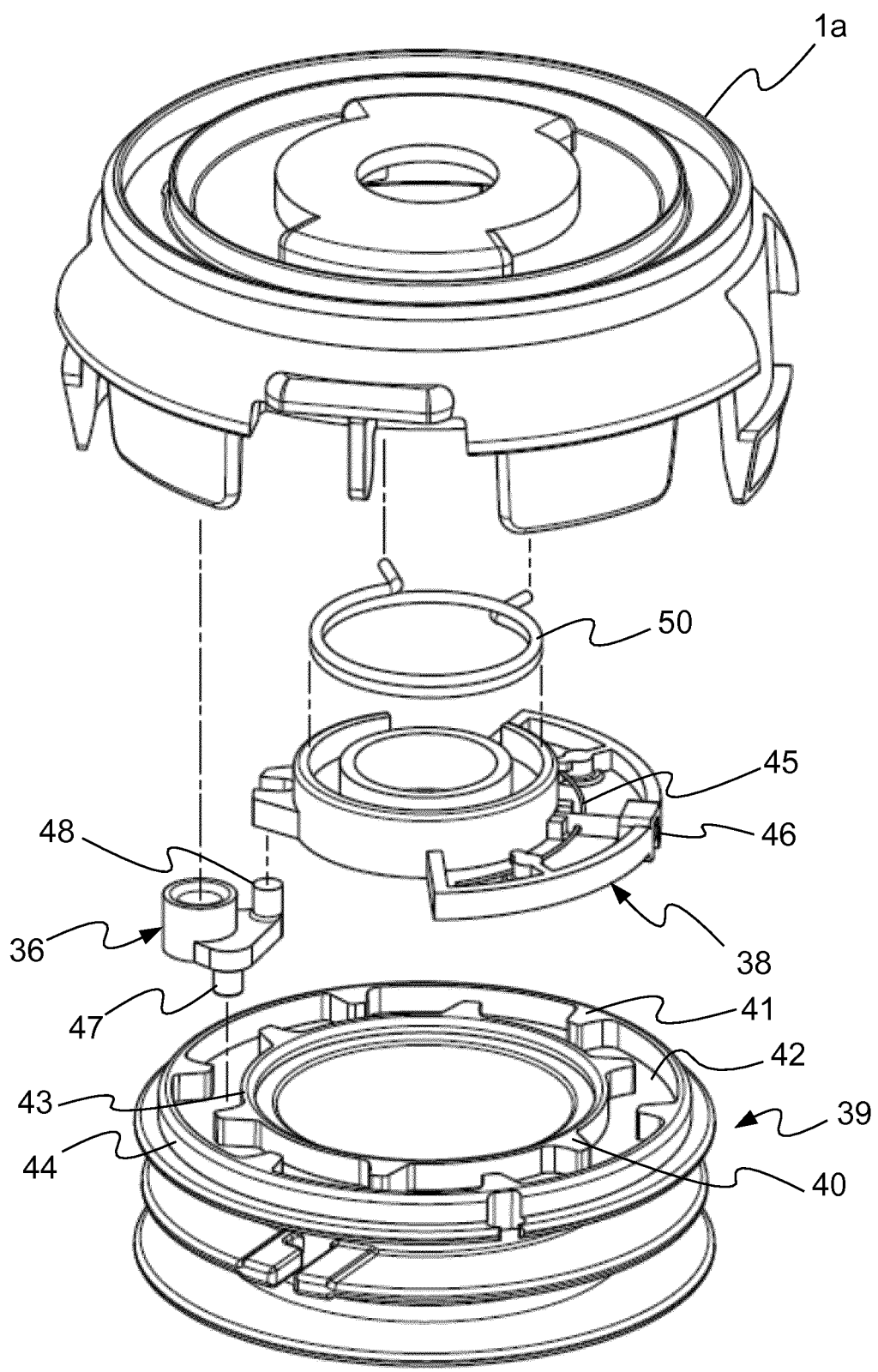
FIG. 15 shows an exploded view of a part of the trimmer head according to the second example embodiment.

The recess 42 comprises an inner circumferential wall 43 and an outer circumferential wall 44. The recess 42 is provided with at least one radially protruding inner stop 40 extending from the inner circumferential wall 43, and at least one radially protruding outer stop 41 extending from the outer circumferential wall 44. As shown in FIGS. 14-15, in this embodiment the recess 42 comprises six inner stops 40 and six outer stops 41. The inner stops 40 are displaced relative the outer stops 41. In other embodiments, there may be either more or fewer stops.

Figure 16:
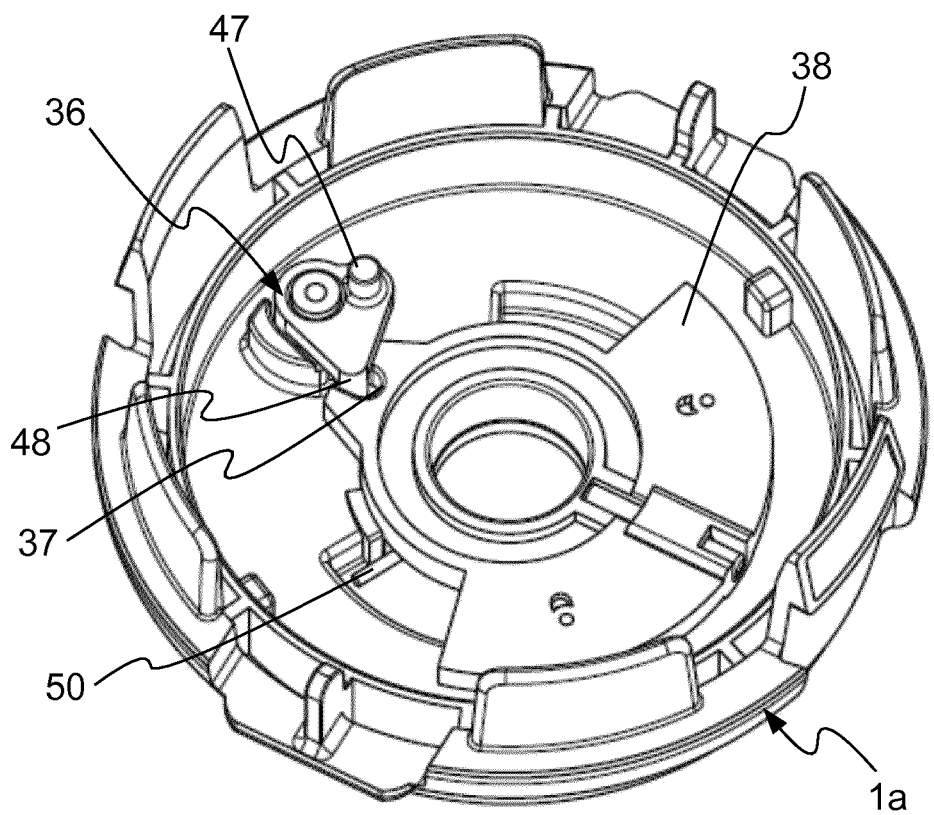
FIG. 16 shows an up-side-down view of an upper body of the trimmer head according to the second example embodiment.
Figure 17:
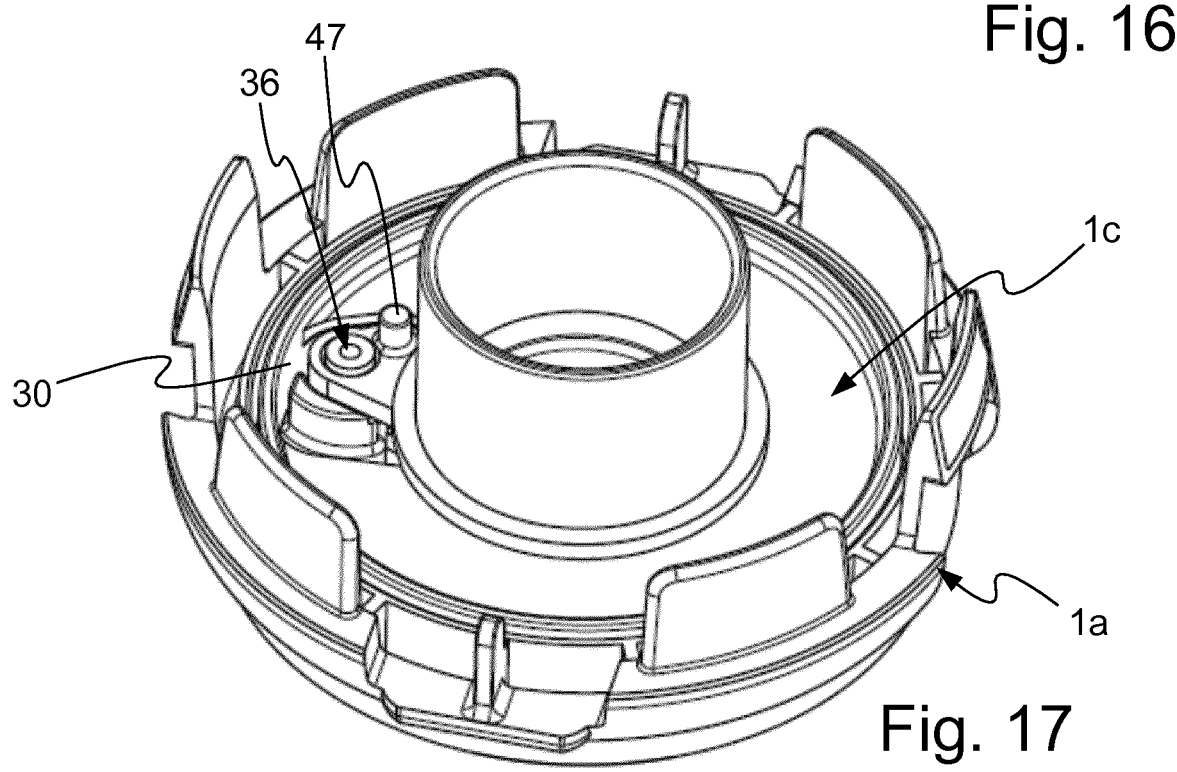
FIG. 17 shows an up-side-down view of the upper body and an inner body of the trimmer head according to the second example embodiment.

The locking pin 48 of the locking lever 36 is arranged in the notch 37 of the spring holding member 38, which is shown especially in FIG. 16. The guiding pin 47 is arranged to pass through the opening 30 of the inner body 1*c*. This is shown in FIG. 17. On the other side of the inner body 1*c*, the guiding pin 47 is arranged to extend into the recess 42 of the spool 13, where it, during normal operation of the trimmer 1, rests against one of the inner stops 40.

During start up of the trimmer 1, at a specific speed, e.g. in the range of 500-1000 rpm, the centrifugal force of the pin 46 will overcome the opposing force of the spring wire 45, moving the pin 46 radially outwards and into a locking groove 49*a*, 49*b* of the inner body 1*c*. Thereby, the spring holding member 38 and the inner body 1*c* are locked to each other. A centrifugal lock is thus accomplished, and all parts of the trimmer head 1 rotate as one unit. Which one of the locking grooves 49*a*, 49*b* that are used depends on if the trimmer head 1 rotates clockwise or counterclockwise.

To accomplish relative movement between the parts of the trimmer head 1 in order to feed trimmer line 3 by centrifugal force the motor 2, or the drive shaft, is caused to abruptly decrease the rotation speed by a 50%, as described in relation to the previous example embodiment. In the present embodiment, this causes the torsion spring 50 to deflect, and thereby the spring holding member 38 to rotate. When the spring holding member 38 rotates, it pulls the locking lever 36 by the locking pin 48 such that guiding pin 47 is forced to leave its initial position at one of the inner stops 40 and is forced towards the outer wall 44 of the recess 42. The spool 39 is thus free to continue its rotational movement until the guiding pin 47 hits the adjacent outer stop 41. During this movement, trimmer line 3 is fed by the rotational force with a length corresponding to the arc distance between the inner stop 40 and the adjacent outer stop 41.

Thereafter, the speed is increased to the operating speed again, causing the guiding pin 47 to return to the inner wall 43 of the recess 42, and thus, the spool 39 is free to rotate yet a distance, and thus feed trimmer line 3, until the guiding pin 47 hits the adjacent inner stop 40. Thus, the total length of trimmer line 3 fed in one operation corresponds roughly to the arc distance between two adjacent inner stops 40.

An advantage with this embodiment is that the spring coefficient of the torsion spring 50 is balanced such that it is not compressed by normal braking of the trimmer 10. Thus, no trimmer line 3 is fed when the trimmer 10 is stopped, but only when more trimmer line 3 actually is required.

Another advantage with this embodiment is that the height of the trimmer head 1 is low, which enables a low cutting height.

Variants and variations of common features and features applicable to both the described embodiments are to be taken as belonging or being part of or applicable to both embodiments.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A trimmer head of a trimmer, the trimmer head comprising:
　a housing comprising an upper housing and a lower housing, the upper housing configured to be coupled to a lower housing;
　an inner body arranged within the upper housing and the lower housing and configured to rotate via a drive shaft of the trimmer;
　a torsion spring coupled to the housing and disposed axially relative to an axis of rotation of the drive shaft; and
　a trimmer line spool arranged within the upper housing and the lower housing and comprising trimmer line spooled around the trimmer line spool,
　wherein, in response to a cutting operation of the trimmer head, the housing, the inner body, and the trimmer line spool are rotatably coupled, and
　wherein in response to a user of the trimmer initiating a feed of the trimmer line, a spring bias of the torsion spring applied to the housing is overcome due to a centrifugal force to disengage an interaction with a stop disposed on the trimmer line spool and rotate the trimmer line spool independently of the housing to release the trimmer line spooled around the trimmer line spool.

2. The trimmer according to claim 1, wherein in response to the user of the trimmer initiating a feed of the trimmer line, a rotation direction or a rotation speed of the drive shaft is configured to change.

3. The trimmer according to claim 2, wherein the trimmer is further configured to change the rotation speed by accelerating the rotation speed at a rate higher than during the cutting operation or by decelerating the rotation speed at a rate higher than during the cutting operation.

4. The trimmer according to claim 3, wherein the trimmer is further configured to change the rotation speed by increasing the rotation speed momentarily.

5. The trimmer according to claim 3, wherein the trimmer is further configured to change the rotation speed by:
　increasing the rotation speed momentarily to a boosted speed level;
　reduce the rotation speed at maximum deceleration;
　accelerate the rotation speed to the boosted speed level; and then
　returning to the rotation speed associated with the cutting operation.

6. The trimmer according to claim 1, wherein the trimmer is a garden trimmer.

7. The trimmer according to claim 1, wherein the trimmer is an electric trimmer.

8. The trimmer according to claim 1, wherein the trimmer is a combustion engine powered trimmer.

9. A trimmer head according to claim 1, wherein the trimmer head further comprises a locking lever mounted in the upper housing, wherein the trimmer line spool comprises a recess in which the one or more stops are disposed, wherein a portion of the locking lever passes through the inner body to extend into the recess of the trimmer line spool, wherein in response to the cutting operation of the trimmer head, the locking lever has a rest position against one of the one or more stops of the trimmer line spool, and wherein in response to the user of the trimmer initiating the feed of the trimmer line, the locking lever is removed from the rest position and trimmer line spool is configured to rotate independently of the upper housing, the lower housing, and the inner body.

10. The trimmer head according to claim 9, wherein the trimmer head further comprises a spring holding member arranged in the upper housing.

11. The trimmer head according to claim 10, wherein the trimmer head further comprises a locking lever arranged to cooperate with the spring holding member to enable the locking lever to be removed from a rest position.

12. A method for controlling a trimmer comprising a trimmer head comprising a housing, the housing comprising an upper housing and a lower housing, the upper housing being coupled to a lower housing, the trimmer further comprising a torsion spring coupled to the housing and disposed axially relative to an axis of rotation of the drive shaft, a trimmer line spool arranged within the upper housing and the lower housing and comprising a trimmer line spooled around the trimmer line spool, and an inner body arranged within the upper housing and the lower housing and configured to rotate via a drive shaft of the trimmer, the method comprising:
　operating the trimmer head at a rotation direction and a rotation speed associated with a cutting operation, wherein, in response to the cutting operation, the housing, the inner body, and the trimmer line spool are rotatably coupled;
　receiving an input that the trimmer line of the trimmer line spool is to be fed; and
　in response to receiving the input that the trimmer line is to be fed, changing either the rotation speed or the rotation direction of the drive shaft causing a spring bias of the torsion spring applied to the housing to be overcome due to a centrifugal force to disengage an interaction with a stop disposed on the trimmer line spool and rotate the trimmer line spool independently of the housing, thereby releasing the trimmer line spooled around the trimmer line spool.

13. The method according to claim 12, wherein the method further comprises changing the rotation speed by reversing the rotation direction.

14. The method according to claim 12, wherein the method further comprises changing the rotation speed by accelerating the rotation speed momentarily.

15. The method according to claim 12, wherein the method further comprises changing the rotation speed by:
　accelerating the rotation speed momentarily to a boosted speed level;
　reduce the rotation speed at maximum deceleration;
　accelerate the rotation speed to the boosted speed level; and then
　returning to the rotation speed associated with the cutting operation.

* * * * *